UNITED STATES PATENT OFFICE.

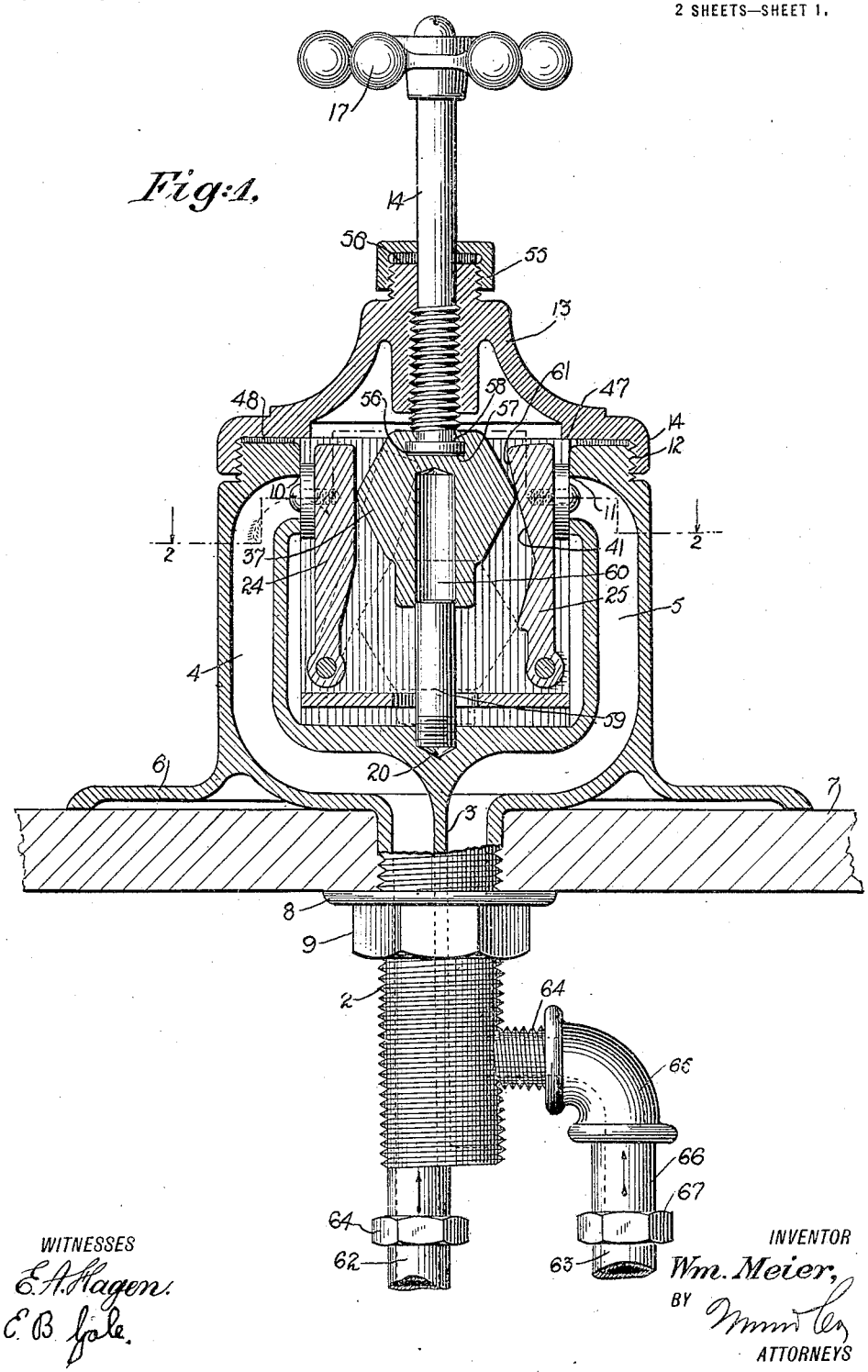

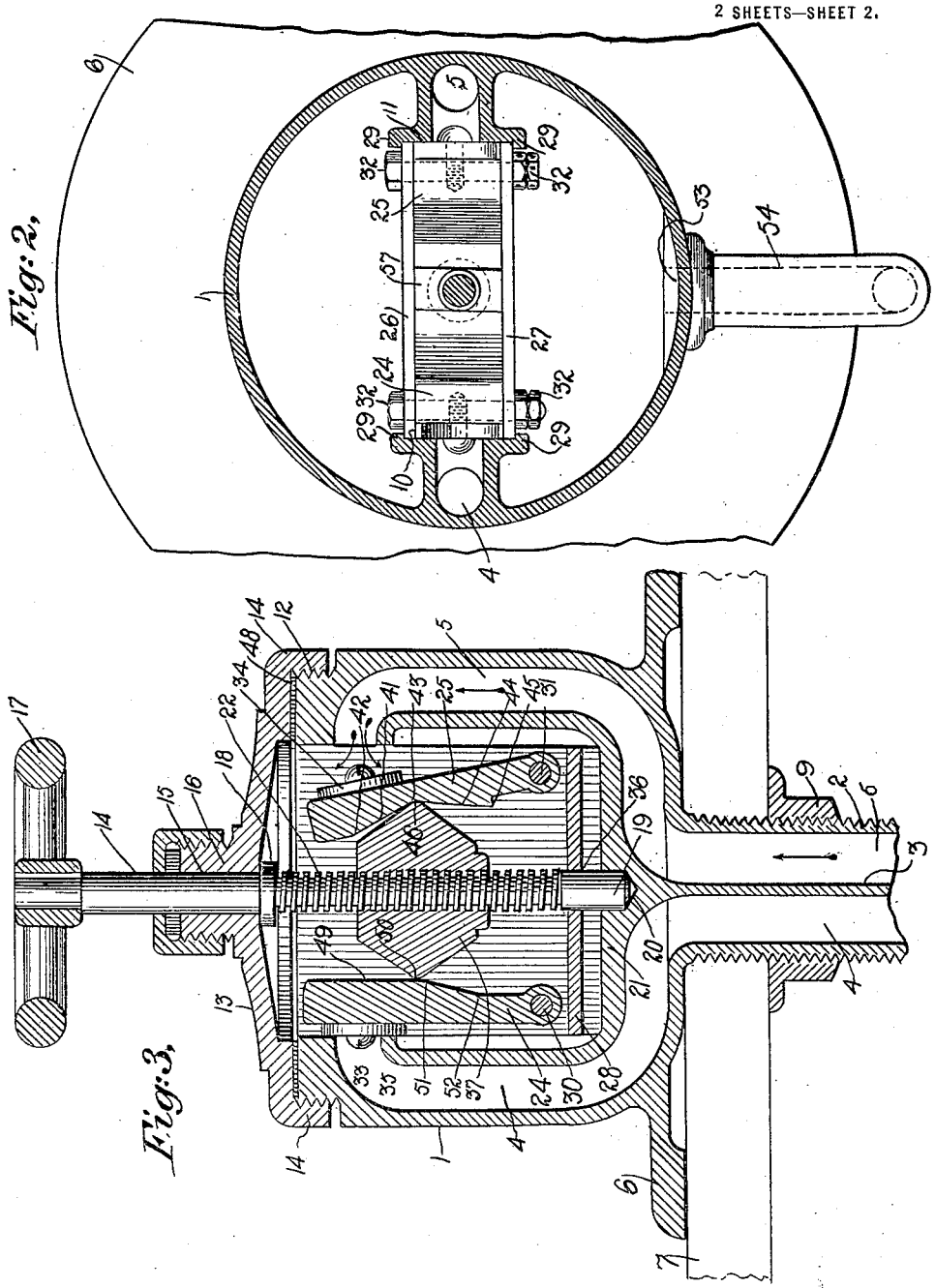

WILLIAM MEIER, OF NEW YORK, N. Y.

COMBINATION-FAUCET.

1,371,922.  Specification of Letters Patent.  Patented Mar. 15, 1921.

Application filed June 19, 1919. Serial No. 305,269.

*To all whom it may concern:*

Be it known that I, WILLIAM MEIER, a citizen of the United States, and a resident of the city of New York, borough of Manhattan, in the county of New York and State of New York, have invented a new and Improved Combination - Faucet, of which the following is a full, clear, and exact description.

This invention relates generally to an improved faucet and more particularly to a combination faucet which may be used to mix liquids, for example, hot and cold water, in various proportions.

In the construction heretofore suggested for mixing liquids there is required the use of springs, complicated forms of various parts of the faucet and which has necessitated the use of the various inlets at different points and so by reason of the above has produced a construction, the application of which has been limited to its use in connection with either a sink, basin, shower or bath.

One of the objects of this invention is to provide a single control combination fluid mixer of simple construction having relatively few parts, so constructed and positioned that the parts may be readily assembled or disassembled in order to repair or replace any of the various parts.

A further object is to provide a hot and cold water faucet which overcomes the above-named objections and eliminates the necessity for use of springs in the construction and operation thereof.

Still another object of this invention is to provide a combination hot and cold water faucet having but one common inlet for the different sources of supply, the parts being so formed that the faucet may be used with equal facility either as a sink, basin, shower or bath faucet, the inlets being so arranged that the pipe connections, when used in connection with either of the above, may be conveniently and readily made with the inlet passages of the casing.

Still another object of this invention is to provide a combination faucet having the parts so arranged that as the valve washers become worn, the actuating parts are automatically moved to compensate therefor.

The above objects are accomplished by providing a casing having an opening at one end thereof with a tubular portion extending therefrom and having a partitioning member therein forming independent passages, the said passages extending within the casing and forming openings on opposite sides thereof, which openings serve as valve seats, there being provided within the casing a box-like structure having hinged gate members, each of said gate members having a washer thereon as a means for closing the respective passages, the said gates having formed on the back thereof, inclined surfaces suitably arranged so that a member slidable within the box controls the positioning of the gates so that one of the gates may be gradually opened, after which upon further movement of the sliding member, the gate will be gradually closed and simultaneously with such movement, the other gate member will be gradually opened until the limit of movement of the sliding member is reached, at which time the first-named gate will be closed and the second gate member will be fully opened.

The above movements of the gate members correspond to a condition in the mixing of liquids, for example, cold and hot water, in which at first the cold water supply gradually increases until the fully opened position is reached, at which time a small amount of warm water will be mixed with the cold, but with continued movement the cold water is gradually diminished and the warm water supply gradually increases until a point is reached when a full supply of warm water only is provided, the cold water being entirely shut off.

Other objects and advantages will be apparent from the following description and the accompanying drawings in which similar characters of reference designate like parts in the several views.

Figure 1 is a sectional elevation view of a modified form of the faucet embodying the invention.

Fig. 2 is a sectional view looking in the direction of the arrows and taken on the line 2—2 of Fig. 1.

Fig. 3 is a sectional elevation view showing a preferred form of the invention.

In the drawings showing a preferred form and modification of the invention, the faucet is shown as comprising a cylindrical-shaped casing 1, having a tube or pipe 2 extending from one side thereof being formed preferably integral with said casing, there being provided a partitioning member 3 extending longitudinally of the pipe 2 to form independent passages 4, 5 respectively therein.

The casing 1 may be provided with a suitable annular flange 6 projecting from the casing and preferably being integral therewith, the said flange serving to position the casing relative to a supporting member 7 which may be a portion of either a basin, sink, bath tub or shower partition. The projecting pipe 2 is preferably threaded so that a washer 8 and nut 9 may be threaded thereon to hold the casing in its proper position relative to the supporting body 7. The independent passages 4 and 5 extend inwardly of the casing and on opposite sides thereof, the ends of the passages being open and turned inwardly of the casing to form valve seats 10 and 11 respectively.

In the preferred form, the casing 1, flange 6, tube 2 and partition 3 are preferably formed in one casting of brass or bronze, or other suitable material, the passages 4 and 5 being formed therein.

The upper part of the casing is open and is provided with a threaded shoulder 12. A cover 13 having a downwardly extending flange 14 is threaded on the shoulder 12. The portion of the cover positioned over the open portion of the casing is spaced from said casing a suitable distance, the purpose of which spacing being later explained.

In Fig. 3 a valve stem 14 extends downwardly through an opening 15 in a guide 16 of the cover 13. A suitable handle 17 is removably secured to the top of the stem 14. A suitable shoulder 18 is formed on the stem 14 to contact with the inner side of the cover 13 to prevent the withdrawal of the stem 14 therefrom. The bottom part 19 of the stem 14 is held in a recess 20 formed in the bottom 21 of the casing, the intermediate portion 22 of the stem between the shoulder 18 and the bottom 19 being threaded. It is thus seen that as the upper and the lower parts of the stem 14 are positively guided or positioned, the distance between the valve seats 10 and 11 and the stem 14 will be fixed. The importance of this point will later be seen.

A box-like construction 23, having gate members 24 and 25 pivoted therein, is positioned within the casing 1. The box-like construction comprises sides 26, 27 connected by the spacing member 28 at the bottom thereof, the bottom of the side members resting upon the bottom 21 of the casing and extending upward so that the top edge thereof will be in substantial alinement with the top of the casing.

The width of the sides 26 and 27 are such as will permit them to slide freely between the valve seat faces 10 and 11, there being provided at the sides of said faces flanges 29 which serve to properly position the box construction. The bottom spacing member 28 between the sides 26 and 27 is of such a width as will space the sides so as to be guided between the flanges 29 of the valve seat faces.

One end of the gate members 24 and 25 is pivotally carried in the box between the sides 26, 27 on bearing pins 30, 31, the said pins being held in position preferably by nuts 32 threaded on the ends thereof. By thus pivotally carrying one end of each of the gate members 24 and 25 within the box, the other freely movable end thereof is brought into alinement with the valve seats 10 and 11 respectively, and there is positioned on the face of the gate members adjacent the valve seat, washers 33, 34, which may be secured on the gate by any usual means, such as a screw 35. The spacing member 28 is provided with an opening 36, through which the lower end of the stem 19 may extend.

As a means of controlling the movement of the gate members from the handle 17 through the stem, there is provided a gate actuating member 37 guided on the threaded portion of the stem 22 between the sides 26, 27 of the box and held against rotation thereby. As the handle 17 is turned, the stem 14 and the threaded portion 22 thereof rotate so that the gate actuating member 37 is moved up or down on the threaded part 22 of the stem depending upon the direction of rotation of the handle.

As a means of obtaining the opening and closing of the gate members 24 and 25 corresponding to a movement of the gate actuating member 37, the side of the gate members adjacent to the valve stem is provided with an inclined surface. If it is assumed that the passage 5 is connected with the cold water pipe and that the passage 4 is connected with the hot water and it is desired to first have the cold water and then a mixing of the cold and hot water and then the hot water only, the movement of the gates must be so controlled that the gate 25 will be moved from a closed position to a fully opened position, at which point the valve 24 will start to be opened so that further movement from this point will gradually close the cold water passage by the gate 25 and gradually open the hot water passage by the gate 24 until the gate 24 is fully opened and the gate 25 is closed. In order to accomplish such a result the back of the gate member is provided with an inclined surface 41 extending from the point 42 to the point 43, and another inclined surface 44 extending from 43 to 45, the latter being in opposite direction to the first inclined surface 41.

It is thus seen that as an edge 46 of the gate actuating member slides downwardly in contact with the inclined surface 41, the pressure in the passage 5 acting against the washer 34 will open the gate and permit the liquid to flow within the box, from there to the inside of the casing by flowing thereover between the top edge of the sides 26 and 27 and the under surface of the cover 13. It is for this reason that the under surface of the cover 13 is required to be spaced from the top edges of the sides 26 and 27 of the box-like construction.

The gate 24 for the hot water supply is to be controlled by movement of the gate actuating member 37 so that when the gate 25 is wide open, the gate 24 will begin to open to permit the hot water to mix with the cold. The gate 24 will be held against movement, while the gate 25 is moved from a closed to a fully opened position.

In the preferred form shown, this action is obtained by providing a plane flat surface 49 extending parallel with the valve stem 14 so that as an edge 50 of the gate actuating member 37 moves downward, the washer 33 carried by the gate 24 will remain on the valve seat. In order to permit the gate 24 to open upon further movement of the gate actuating member 37, the surface of the gate member from a point 51 to a point 52 is inclined so that the distance from the back of the gate at the point 52 and the threaded portion 22 of the stem will be greater than the distance between the back of the gate at the point 51 and the threaded stem. It is thus seen that the edge 50 is moved downwardly so that the water pressure acting against the upper end of the gate 24 will move the gate and permit the hot water to flow within the casing. When the member 37 has reached its low limit of travel, the cold water outlet will be closed and the hot water outlet will be fully opened.

With reference to the form of the gate actuating member 37, it may be stated that it is only necessary that it be so constructed as to afford two edges which may be in sliding engagement with the surfaces of the gate members, that they be of such shape that will permit the gate members to fully open and that a sufficient bearing surface be provided on the threaded portion of the stem.

In the preferred form shown, the sides of the member 37 adjacent to the gates are preferably shown angular in form having the edges 46 and 50 positioned at equal distances from the ends of the gate actuating member 37.

In the above description when words "gate" or "gate member" are used, it is understood that such words are used in a broad sense to include any member or means carried by the box-like construction to function as a valve. Further, when reference is made to a box or box-like construction, such terms are used generally to include any member or construction removably positioned within the casing and to act as a carrier of the gate members.

As a means of withdrawing the water from the casing, there is provided an outlet 53 having an outlet pipe 54 of suitable shape connected therewith. It is understood that the use made of the combination faucet will determine the particular shape to be given to the outlet 54.

In Fig. 1 a certain part of the cover extends inwardly of the valve seats 10 and 11 and further extends inwardly of the ends of the sides 26 and 27 of the box construction, thus forming a shoulder 47, which abuts against the upper edge of the side members of the box construction to keep it firmly positioned within the casing when the cover is secured thereto. An annular washer 48, composed of suitable material, is placed between the upper edge of the casing and the cover 13. A cap 55, having an opening therein to receive the stem 14, is preferably threaded on the upper part of the cover 13, and a suitable packing 56 may be placed between the cover and the cap.

There is shown in Fig. 1 a modified construction in which the lower end of the stem 14 is threaded and guided in the cover 13, there being provided at the lower end of the stem a shoulder 56 positioned in a slot 57 formed in the top of the gate actuating member 37. The slot 57 is provided with inwardly extending flanges 58, which extend inwardly above the shoulder 56 to prevent the withdrawal of the end of the stem from the gate actuating member 37, but permit the shoulder 56 to be freely rotated therein.

A stud 59 is threaded in the recess 20 at the bottom of the casing and extends upwardly so that the end thereof extends within a recess 60 extending within the gate actuating member 37, the stud 59 fitting snugly therein. The recess 60 is of a sufficient depth to permit the full travel of the gate actuating member 37. The lateral or transverse movement of the gate actuating member 37 is prevented by providing the stud 59 to guide the gate actuating member 37.

In Fig. 1 that part of the gate surface 61 extending above the edge 46 of the gate actuating member is shown as a continuation of the inclined surface 41. Such a construction is provided in order to compensate for wear of the parts and of the washer. If, for example, the washer 11 becomes worn, it is only necessary, in order to assure a proper seating thereof upon the valve seat 11, that the gate actuating member 37 be moved upwardly when the edge 46 would ride on the surface 61 and thus cause the washer to be positively seated. A similar provision may be made to compensate for such conditions on the other gate, if desired.

There is further shown in Fig. 1 a means for connecting main inlet pipes 62, 63 with the tubular inlet pipe 2 having the partition 3 therein forming the two passages 4, 5. Of course, the exact piping arrangement will be determined by the conditions under which the faucet is to be used. If it is assumed in the drawings, as shown, that the stem is to be in a vertical position, as would be the case if the partition member 7 was a section of the basin, and the tubular pipe 2 extended therethrough, one of the main supply pipes 62 would be positioned in alinement with the hot water passage 4 and directly connected thereto by a suitable coupling nut 64. In order to connect the other pipe 63, which we will assume is the cold water supply, to the cold water passage 5, it would be necessary to close the end of the passage 4 extending within the tubular extension 2 and insert a threaded length of pipe 64 in the side of the tubular extension 2, and to provide an elbow 65 and another length of pipe 66 to connect with the main supply pipe 63 by another coupling nut 67.

By providing the common divided inlet pipe for the casing having separate passages leading to independent passages within the casing, it is seen that the combination faucet, so arranged and constructed, is readily adapted to a variety of uses and, further, readily adapts itself for different piping arrangements.

The invention herein is intended to broadly cover a construction having a removable member within the casing, having fixed thereto a plurality of movable elements which function as valve bodies, there being provided a movable member of suitable form actuated by the valve stem to successively or simultaneously actuate the valve functioning members. An important feature in such a construction is the ease with which the parts may be disassembled for purposes of adjustment or replacement of worn parts.

Certain changes and modifications may be made without departing from the spirit and scope of this invention.

Having thus described the invention, what I claim as new is:

1. A combination hot and cold water faucet comprising a casing substantially cylindrical in form and open at one end thereof, a tubular passage extending from the opposite end thereof having a dividing member extending longitudinally thereof to form independent passages therein, the said passages extending inwardly of the casing and having the ends thereof open on opposite sides thereof, a cover secured to the open end of said casing, a valve stem extending therethrough and rotatably carried therein, a box-like member removably positioned within said casing between the passages therein, gate members hinged to said member having the free end thereof positioned in front of the respective passages to act as a closure therefor, and a member mounted on the stem for controlling the movement of the gate members.

2. A hot and cold water faucet comprising a casing, substantially cylindrical in form open at one end and having a tubular pipe-like member extending from the opposite end thereof, a dividing member extending longitudinally of said tubular member to form independent passages therein, the said passages extending inwardly on opposite sides of the casing and having the ends thereof open, a cover having a hollow central portion threaded to the casing, a valve stem having the upper end thereof guided within the cover, a shoulder positioned on said stem to abut against the under side of the cover, the lower end of said stem being positioned in a recess at the bottom of said casing, the intermediate portion of said stem being threaded, a box-like structure removably held in the casing between the openings of the passages, gate members having one end thereof pivoted to the box-like structure, the other free end being in alinement with the open passages to function as a closure therefor, and a gate actuating member threaded on said stem and movable longitudinally thereof and guided in the box-like structure and held against rotative movement thereby.

3. A hot and cold water faucet comprising a casing, substantially cylindrical in form open at one end and having a tubular pipe-like member extending from the opposite end thereof, a dividing member extending longitudinally of said tubular member to form independent passages therein, the said passages extending inwardly on opposite sides of the casing and having the ends thereof open, a cover having a hollow central portion threaded to the casing, a valve stem having the upper end thereof guided within the cover, a shoulder positioned on said stem to abut against the under side of the cover, the lower end of said stem being positioned in a recess at the bottom of said casing, the intermediate portion of said stem being threaded, a box-like structure removably held in the casing between the openings of the passages, gate members having one end thereof pivoted to the box-like structure, the other free end being in alinement with the open passages to function as a closure therefor, and a gate actuating member threaded on said stem and movable longitudinally thereof and guided in the box-like structure and held against rotative movement thereby, the said gate actuating member functioning to move the gates either successively or simultaneously.

WILLIAM MEIER.